(12) United States Patent
Kataoka et al.

(10) Patent No.: US 9,690,281 B2
(45) Date of Patent: Jun. 27, 2017

(54) MACHINE TOOL AND MACHINING CONTROL DEVICE THEREOF

(75) Inventors: Takayuki Kataoka, Hirakata (JP); Eiji Nabata, Kyotanabe (JP); Noriaki Kojima, Hirakata (JP)

(73) Assignee: KOMATSU LTD., Tokyo (JP)

( * ) Notice: Subject to any disclaimer, the term of this patent is extended or adjusted under 35 U.S.C. 154(b) by 876 days.

(21) Appl. No.: 14/003,822

(22) PCT Filed: Mar. 23, 2012

(86) PCT No.: PCT/JP2012/057586
§ 371 (c)(1),
(2), (4) Date: Sep. 9, 2013

(87) PCT Pub. No.: WO2012/133222
PCT Pub. Date: Oct. 4, 2012

(65) Prior Publication Data
US 2013/0345851 A1    Dec. 26, 2013

(30) Foreign Application Priority Data
Mar. 31, 2011 (JP) ................. 2011-080696

(51) Int. Cl.
*G05B 19/18* (2006.01)
*G05B 19/40* (2006.01)
*G05B 19/404* (2006.01)

(52) U.S. Cl.
CPC ........... *G05B 19/18* (2013.01); *G05B 19/404* (2013.01); *G05B 2219/41115* (2013.01)

(58) Field of Classification Search
CPC .............. B23Q 17/0976; G05B 19/404; G05B 2219/41207; G05B 2219/41121;
(Continued)

(56) References Cited

U.S. PATENT DOCUMENTS

2006/0271231 A1   11/2006  Olgac
2007/0201956 A1*  8/2007   Onozuka ................. B23C 3/00
                                                           407/30

(Continued)

FOREIGN PATENT DOCUMENTS

DE    10 2005 023 317 A1    11/2006
DE    10 2009 050 993 A1    4/2010
(Continued)

OTHER PUBLICATIONS

International Search Report for PCT/JP2012/057586, issued on Jun. 12, 2012.
(Continued)

*Primary Examiner* — Jason Lin
(74) *Attorney, Agent, or Firm* — Global IP Counselors, LLP

(57) ABSTRACT

A machining control device controls spindle rotational speed. A set of stability limit curve data is stored indicating a relation between a spindle rotational speed and a limit cutting-in amount whereby chatter vibrations are inhibited. Spindle rotational speed and tool cutting-in amount in starting machining are set based on the data. Vibrations of the spindle are detected during cutting. Whether chatter vibrations have occurred is determined based on vibrations detection. Spindle rotational speed is controlled with reference to the data to inhibit chatter vibrations. Cutting-in amount in starting machining is set to be less than a maximum cutting-in amount within a stable region of the data, and spindle rotational speed in starting machining is set to be less than a rotational speed when the cutting-in amount is maximum within the stable region. Spindle rotational speed is increased by an amount of a predetermined rotational speed when chatter vibrations have occurred.

8 Claims, 10 Drawing Sheets

(58) Field of Classification Search
CPC .......... G05B 19/18; G05B 2219/41115; Y10T 82/2595; Y10T 409/304312; B23C 2210/282; B23C 2250/16
USPC ........................................................ 700/174
See application file for complete search history.

(56) References Cited

U.S. PATENT DOCUMENTS

| | | |
|---|---|---|
| 2009/0013790 A1 | 1/2009 | Roders |
| 2010/0010662 A1* | 1/2010 | Inagaki .............. B23Q 17/0976 700/175 |
| 2010/0104388 A1 | 4/2010 | Suzuki et al. |
| 2012/0136474 A1* | 5/2012 | Miyamoto ......... B23Q 17/0976 700/173 |

FOREIGN PATENT DOCUMENTS

| | | | |
|---|---|---|---|
| JP | 2005-74568 A | 3/2005 | |
| JP | 2005-74569 A | 3/2005 | |
| JP | 2007-167980 A | 7/2007 | |
| JP | WO 2010103672 A1 * | 9/2010 | ......... B23Q 17/0976 |
| JP | 2012-56051 A | 3/2012 | |
| WO | 2010/103672 A1 | 9/2010 | |

OTHER PUBLICATIONS

Office Action for the corresponding German application No. 11 2012 001 500.2, issued on Oct. 13, 2015.

* cited by examiner

MACHINE TOOL AND MACHINING CONTROL DEVICE THEREOF

CROSS-REFERENCE TO RELATED APPLICATIONS

This application claims priority to Japanese Patent Application No. 2011-080696 filed on Mar. 31, 2011, and is a U.S. National stage application of International Application No. PCT/JP2012/057586, filed Mar. 23, 2012.

BACKGROUND

Field of the Invention

The present invention relates to a machining control device, and particularly to a machining control device configured to control the rotational speed of a spindle to which a tool for cutting a workpiece is attached and a machine tool provided with the same.

Background Information

For example, in boring a workpiece with a milling tool, the tool is required to have a long length for avoiding spatial interference between the tool and the workpiece. In such a tool, a distance becomes long between a blade part and a part chucked by a spindle, and thereby, the stiffness of the tool becomes relatively weak.

Now, when an undulation is left uncut on a workpiece in the previous cutting step, the tool in a cutting motion is configured to be shifted and cut the workpiece along a target profile in the next cutting step. In this case, the cutting thickness is supposed to vary. In such a cutting process, where the stiffness of the tool is weak as described above, variation in cutting force excites normal mode of the tool, and thereby, chatter vibrations come to easily occur during the cutting process.

In view of this, in a well-known cutting process, a machining condition under which chatter vibrations do not occur is found out by executing a trial machining operation a plurality of times, and an optimal machining condition is configured to be set in accordance therewith.

Further, as described in Japan Laid-open Patent Application Publication No. JP-A-2007-167980, a method has been also proposed that chatter vibrations are predicted using a stability limit curve and a machining condition is set in accordance therewith. In the method described in Patent Literature 1, a parameter such as a cutting force characteristic value, determined based on a tool specification and a workpiece material, is set as an input value. In accordance with the input value, an initial value is set for a stability limit cutting-in amount so that chatter vibrations do not occur. Further, comparison is executed between the initial value and a value calculated based on the initial value, and the initial value is modified based on the result of comparison. The aforementioned processing is repeated, and the stability limit cutting-in amount is determined when an error between the modified initial value and the calculated value falls within a predetermined range.

SUMMARY

In a well-known method of setting a machining condition through a trial machining operation, the trial machining operation is required to be executed a plurality of times and a complicate work is required for setting the machining condition. Further, the trial machining operation is required to be executed every time a tool or a workpiece is changed.

On the other hand, according to the method described in Japan Laid-open Patent Application Publication No. JP-A-2007-167980.

It is theoretically possible to determine the cutting-in amount whereby chatter vibrations are inhibited, but a drawback is produced as follows.

First, FIG. 1 represents an example of a stability limit curve used in Japan Laid-open Patent Application Publication No. JP-A-2007-167980. In the chart, the horizontal axis is defined as a spindle rotational speed (rpm) whereas the vertical axis is defined as an axial cutting-in amount (mm). Further, the inside region (the lower-side region in the chart) of a stability limit curve A is a stable region in which chatter vibrations are inhibited, whereas the outside region (the upper-side region in the chart) of the stability limit curve A is an instable region in which chatter vibrations occur.

Where the stability limit curve A is assumed as described above, it is herein supposed that a machining operation is executed on a condition of a point a1 within the stable region. At this time, the stiffness of a tool deviates from its reference stiffness and the blank dimension of a workpiece has an error or mismatch from its reference dimension. Therefore, an actual stability limit curve (partially depicted with a broken line A' in FIG. 1) is supposed to be displaced from the stability limit curve A represented in FIG. 1. Accordingly, chatter vibrations are supposed to occur even when a machining operation is executed under the condition a1. Especially, the blank dimension of a workpiece such as a casting product or a forging product has a large error from its reference dimension. Therefore, the actual stability limit curve is often displaced from the stability limit curve set with the premise of a preliminarily set blank dimension. In such case, chatter vibrations are supposed to occur in an actual machining operation, even when the machining operation is executed based on an optimal cutting-in amount a1 obtained through calculation.

In such case, when a machining condition is reset within the stable region by changing the cutting-in amount in order to prevent occurrence of chatter vibrations, it is required to set the cutting-in amount to be a condition a2. In short, in the example of FIG. 1, the cutting-in amount is required to be roughly half. However, when the cutting-in amount is thus remarkably reduced, a machining operation cannot be efficiently executed.

Further, when the cutting-in amount is changed, the amount of material to be cut from the surface of a workpiece in a single pass of cutting (a single moving of a tool) is changed. Therefore, it is required to change the number of passes of cutting in a machining program. Thus, change of the cutting-in amount leads to change of the machining program, and in some cases, this cannot be handled during a machining operation.

It is an object of the present invention to easily and stably inhibit chatter vibrations having occurred during a cutting process in a machine tool configured to execute cutting under a condition set based on a stability limit curve.

A machining control device for a machine tool according to a first aspect of the present invention is a device configured to control a rotational speed of a spindle onto which a tool for cutting a workpiece is attached, and includes a data storage unit, a machining starting condition setting unit, a vibration detection sensor, a chatter vibration determining unit and a rotational speed controlling unit. The data storage unit is configured to store a set of stability limit curve data indicating a relation between a spindle rotational speed and a limit cutting-in amount whereby chatter vibrations are inhibited. The machining starting condition setting unit is configured to set both of a spindle rotational speed and a tool cutting-in amount in starting machining based on the set of stability limit curve data. The vibration detection sensor is configured to detect vibrations of the spindle in cutting. The chatter vibration determining unit is configured to determine whether or not chatter vibrations have occurred based on a result of the detection by the vibration detection sensor. The rotational speed controlling unit is configured to control the spindle rotational speed with reference to the set of stability limit curve data so as to inhibit chatter vibrations when chatter vibrations have occurred.

In the present device, the set of stability limit curve data is stored in the data storage unit. The set of stability limit curve data is a set of data indicating a relation between the spindle rotational speed whereby chatter vibrations are inhibited during cutting and the limit cutting-in amount of the tool. Chatter vibrations are inhibited and machining can be stably executed by setting a machining condition within the stable region of the stability limit curve. The spindle rotational speed and the tool cutting-in amount in starting machining are set based on such set of stability limit curve data. The setting may be configured to be executed by an operator, or alternatively, be automatically executed based on a specification of the tool to be used and/or the like. Further, during machining, vibrations of the spindle are detected by the vibration detection sensor and it is determined whether or not chatter vibrations have occurred based on the detection result. When it is determined that chatter vibrations have occurred, the spindle rotational speed is controlled with reference to the set of stability limit curve data so as to inhibit chatter vibrations.

When it is herein determined that chatter vibrations have occurred, chatter vibrations can be inhibited by controlling the spindle rotational speed. When explained in detail using FIG. 1, the machining starting condition is firstly set to be a condition a1 with reference to the set of stability limit curve data. However, it is herein assumed that the stability limit curve is displaced to be a curve A' due to deviation in stiffness of a tool from its reference stiffness and/or an error in blank dimension of a workpiece from its reference dimension. In this case, the machining condition a1 is plotted within the instable region and chatter vibrations occur during machining. In such case, the machining condition is shifted to a point a3 by reducing the spindle rotational speed. Accordingly, the machining condition is supposed to be plotted within the stable region, and stable machining is enabled while chatter vibrations are inhibited.

As described above, according to this aspect of the present invention, it is possible to easily shift a machining condition plotted within the instable region to the stable region by changing the spindle rotational speed. At this time, it is not required to remarkably change the spindle rotational speed. Therefore, remarkable deterioration in machining efficiency can be avoided. Further, the processing of controlling the spindle rotational speed does not require changing of a machining program, and therefore, can be executed during machining. Thus, the processing can quickly deal with machining situations on a case-by-case basis.

A machining control device for a machine tool according to a second aspect of the present invention relates to the machining control device of the first aspect, and wherein the set of stability limit curve data is calculated based on: a characteristic value of the tool obtained by a vibration analysis; a coefficient determined depending on a material of the workpiece; and a machining condition.

A machining control device for a machine tool according to a third aspect of the present invention relates to the machining control device of the first or second aspects, and wherein the rotational speed controlling unit includes a first rotational speed changing unit, a determining unit and a second rotational speed changing unit. The first rotational speed changing unit is configured to increase or reduce the spindle rotational speed by an amount of a first rotational speed when chatter vibrations have occurred. The determining unit is configured to determine whether or not the spindle rotational speed regulated by the amount of the first rotational speed falls within an allowable range set based on the set of stability limit curve data. The second rotational speed changing unit is configured to reduce or increase the regulated spindle rotational speed by an amount of a second rotational speed less than the amount of the first rotational speed when the regulated spindle rotational speed is not a rotational speed falling within the allowable range.

When chatter vibrations have occurred, the spindle rotational speed is firstly changed by the amount of the first rotational speed. As described above, with reference to the set of stability limit curve data, it is herein possible to obtain for a given cutting-in amount the range of the spindle rotational speed whereby chatter vibrations do not occur (the allowable range).

In view of this, in the third aspect of the present invention, it is determined whether or not the spindle rotational speed changed by the amount of the first rotational speed falls within the allowable range. Further, when not falling within the allowable range, the spindle rotational speed is changed to the opposite side by the amount of the second rotational speed less than the amount of the first rotational speed. In other words, when the spindle rotational speed has been increased by the amount of the first rotational speed, the increased spindle rotational speed is reduced by the amount of the second rotational speed. By contrast, when the spindle rotational speed has been reduced by the amount of the first rotational speed, the reduced spindle rotational speed is increased by the amount of the second rotational speed. With such processing, when chatter vibrations have occurred, the spindle rotational speed can be regulated to a rotational speed whereby chatter vibrations can be reliably inhibited.

A machining control device for a machine tool according to a fourth aspect of the present invention relates to the machining control device of any of the first to third aspects, and wherein the machining starting condition setting unit is configured to: set the cutting-in amount in starting machining to be less than a maximum cutting-in amount within a stable region in the set of stability limit curve data; and set the spindle rotational speed in starting machining to be less than a rotational speed where the cutting-in amount is maximum within the stable region. Further, the rotational speed controlling unit is configured to increase the spindle rotational speed by an amount of a predetermined rotational speed when chatter vibrations have occurred.

Here, the cutting-in amount in starting machining is set within the stable region, and the spindle rotational speed is set on the lower rotational speed side within the stable region. Specifically, in the example of FIG. 1, the cutting-in amount is set to be less than the maximum cutting-in amount (about 3.3 mm) within a given stable region. On the other hand, the spindle rotational speed is set to be 2,600 rpm lower than a rotational speed (about 3,000 rpm) where the cutting-in amount is maximum.

Here, as is also obvious from FIG. 1, in consideration of the characteristic of the stability limit curve, the slope of the spindle rotational speed is steeper on the higher rotational speed side than the lower rotational speed side within the stable region. Therefore, when the spindle rotational speed in starting machining is set in a higher rotational speed side position on the stability limit curve, the condition is shifted back and forth between the stable region and the instable region in response to a minute variation in the spindle rotational speed. In such a state, it becomes difficult to stably inhibit chatter vibrations by controlling the spindle rotational speed.

In view of this, in the fourth aspect of the present invention, the machining starting condition is configured to be set on the lower spindle rotational speed side within the stable region in order to easily control the spindle rotational speed and stably inhibit chatter vibrations.

A machining control device for a machine tool according to a fifth aspect of the present invention relates to the machining control device of any of the first to third aspects, and wherein the machining starting condition setting unit is configured to: set the cutting-in amount in starting machining to be less than a maximum cutting-in amount within a stable region in the set of stability limit curve data; and set the spindle rotational speed in starting machining to be less than a rotational speed where the cutting-in amount is maximum within the stable region. The rotational speed controlling unit is configured to maintain the spindle rotational speed in staring machining when chatter vibrations have not occurred.

When the actual stability limit curve is displaced to the lower spindle rotational speed side where the machining starting condition is set to be a relatively low spindle rotational speed within the stable region, chatter vibrations do not occur even without changing the machining starting condition. Therefore, it can be considered to reduce a machining time by increasing the spindle rotational speed.

However, chances are that the machining condition is shifted into the instable region when the spindle rotational speed is increased. Further, even when the spindle rotational speed is increased, remarkable reduction in machining time cannot be expected.

In view of this, in the fifth aspect of the present invention, the spindle rotational speed is configured to be maintained at the rotational speed in starting machining even under the aforementioned situation.

A machining control device for a machine tool according to a sixth aspect of the present invention relates to the machining control device of any of the first to third aspects, and wherein the machining starting condition setting unit is configured to: set the cutting-in amount in starting machining to be less than a maximum cutting-in amount within a stable region in the set of stability limit curve data; and set the spindle rotational speed in staring machining to be greater than a rotational speed where the cutting-in amount is maximum within the stable region. The rotational speed controlling unit is configured to reduce the spindle rotational speed by an amount of a predetermined rotational speed when chatter vibrations have occurred.

As described above, the stable region has a wide range in terms of the spindle rotational speed. By focusing on this, in the sixth aspect of the present invention, the machining starting condition is set to be a relatively high rotational speed (e.g., 3,000 rpm in the example of FIG. 1) in order to achieve reduction in machining time.

A machining control device for a machine tool according to a seventh aspect of the present invention relates to the machining control device of any of the first to third aspects, and wherein the machining starting condition setting unit is configured to: set the cutting-in amount in starting machining to be less than a maximum cutting-in amount within a stable region in the set of stability limit curve data; and set the spindle rotational speed in starting machining to be greater than a rotational speed where the cutting-in amount is maximum within the stable region. The rotational speed controlling unit is configured to maintain the spindle rotational speed in staring machining when chatter vibrations have not occurred.

When the actual stability limit curve is displaced to the higher rotational speed side where the machining starting condition is set to be the maximum spindle rotational speed within the stable region, chatter vibrations do not occur even without changing the machining starting condition. Therefore, it can be considered to reduce the machining time by further increasing the spindle rotational speed.

However, similarly to the above, chances are that the machining condition is shifted into the instable region when the spindle rotational speed is increased. Further, even when the spindle rotational speed is increased, remarkable reduction in machining time cannot be expected.

In view of this, even in the seventh aspect of the present invention, the spindle rotational speed is configured to be maintained at the rotation speed in starting machining, similarly to the fifth aspect of the present invention.

A machine tool according to an eighth aspect of the present invention includes: a spindle that a cutting tool is attached onto a tip thereof; a numeric control part configured to set and control a machining condition including a cutting-in amount of the cutting tool and a rotational speed of the spindle; and the machining control device recited in any of the first to seventh aspects, which is configured to transmit a control command to the numeric control part.

A machining control method for a machine tool according to a ninth aspect of the present invention is a machining control method for a machine tool including a cutting tool attached onto a spindle thereof, and includes first to sixth steps. In the first step, a set of stability limit curve data, indicating a relation between a spindle rotational speed and a limit cutting-in amount whereby chatter vibrations are inhibited, is calculated based on: a characteristic value of the cutting tool; a coefficient determined depending on a material of a workpiece; and a cutting condition. In the second step, the spindle rotational speed and a tool cutting-in amount are set as a machining condition in starting machining based on the set of stability limit curve data. In the third step, machining is started under the machining starting condition. In the fourth step, vibrations of the spindle in cutting are detected. In the fifth step, it is determined whether or not chatter vibrations have occurred based on a result of the vibration detection in the fourth step. In the sixth step, the spindle rotational speed is controlled with reference to the set of stability limit curve data so as to inhibit chatter vibrations when chatter vibrations have occurred.

In the aspects of the present invention as described above, it is possible to easily and stably inhibit chatter vibrations that occurred during machining in a machine tool configured to execute machining under a condition set based on a stability limit curve.

DESCRIPTION OF THE EMBODIMENTS

Basic Principle of Present Invention

First, a stability limit curve will be explained.

Figure 2:
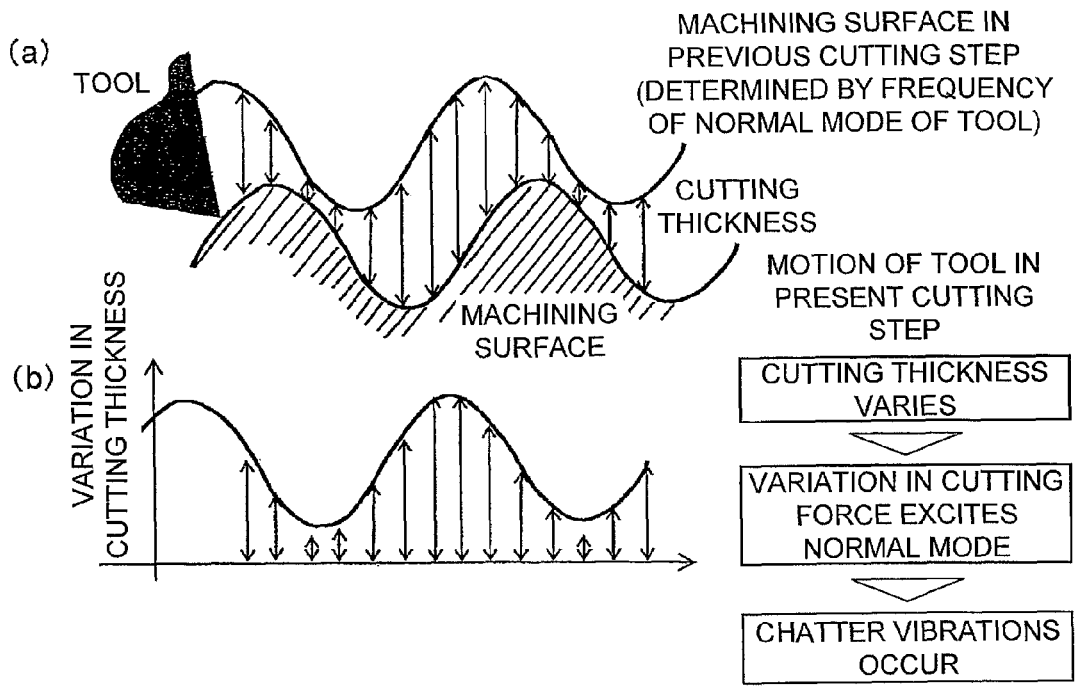
FIG. 2 is a diagram for explaining a cause of chatter vibrations.

Chatter vibrations are attributed to variation in cutting thickness during a cutting process. FIG. 2 represents the situation. As represented in FIG. 2(*a*), when an undulation is left uncut on a workpiece in the previous cutting step, a tool in a cutting motion is configured to be slightly shifted and cut the workpiece along a target profile in the next cutting step. Therefore, as represented in FIG. 2(*b*), the cutting thickness varies; this results in vibratory force that is a cause of chatter vibrations; normal mode is thereby excited; thus, chatter vibrations are supposed to occur.

Figure 3:
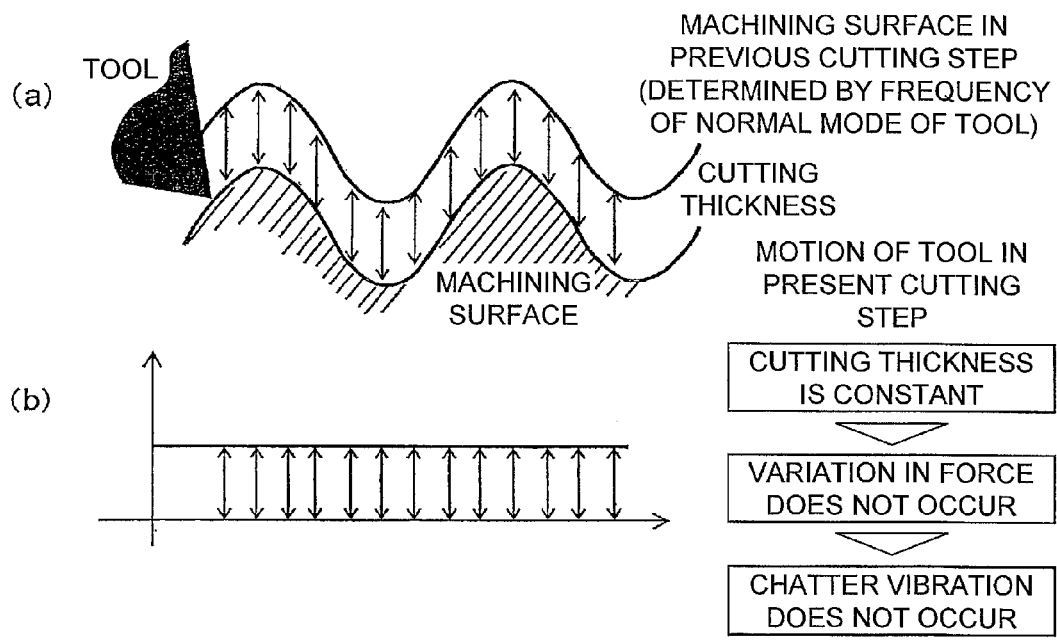
FIG. 3 is a diagram representing a basic principle of the present invention.

In view of this, as represented in FIG. 3, chatter vibrations can be inhibited by controlling the spindle rotational speed in accordance with the frequency of the normal mode of a tool so that the cutting thickness is kept constant. In other words, it would be possible to inhibit chatter vibrations by establishing a predetermined relation between the cutting-in amount by the tool and the cutting cycle. It should be noted that the cutting cycle can be converted into the rotational speed where the number of blades of the tool is given.

Figure 1:
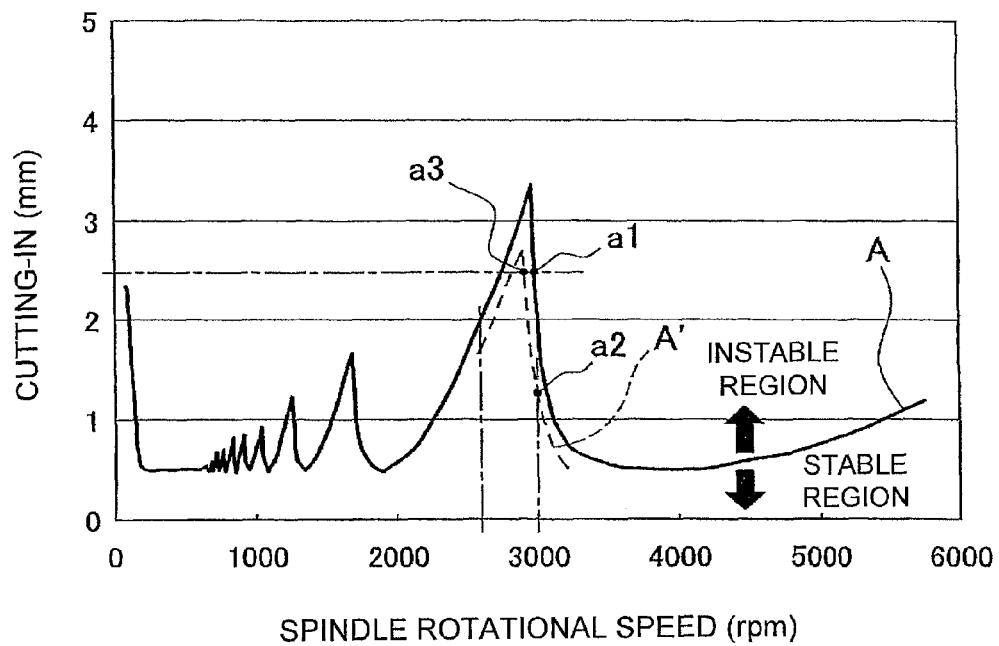
FIG. 1 is a chart representing a stability limit curve.

As is obvious from the above, the limit cutting-in amount as the limit for occurrence of chatter vibrations varies depending on the spindle rotational speed. The stability limit curve represented in FIG. 1 expresses variation in the limit cutting-in amount with respect to the spindle rotational speed.

The motion of the tool in a cutting motion is expressed by the following equations of motion using: mass m; damping constant c; spring constant k; and external force Ff. Further, Kf is specific cutting force, which is a value determined depending on a workpiece material. Yet further, a is set as the axial cutting-in amount; h is set as the cutting thickness; T is set as the time delay (the cutting cycle) in a cutting step. It should be noted that the damping constant c and the spring constant k of the cutting tool can be calculated by executing a vibration analysis for the tool.

$$m\ddot{y}(t)+c\dot{y}(t)+ky(t)=F_f(t)=K_f ah(t)$$

$$h(t)=h_0-[y(t)-y(t-T)] \quad \text{Math. 1}$$

The stability limit curve can be obtained by solving the aforementioned equations of motion. Further, where the stability limit curve is obtained, occurrence of chatter vibrations can be inhibited by setting a machining condition within the stable region.

However, when the stiffness of a tool deviates from its reference stiffness and/or the blank dimension of a workpiece has an error from its reference dimension, an actual stability limit curve is supposed to be displaced from a calculated stability limit curve. Especially, when the workpiece is a casting product or a forging product, its blank dimension has a large error from its reference dimension, and accordingly, the cutting-in amount also greatly varies. Therefore, chatter vibrations may occur even when the machining condition is set within the stable region of the stability limit curve.

Figure 4:
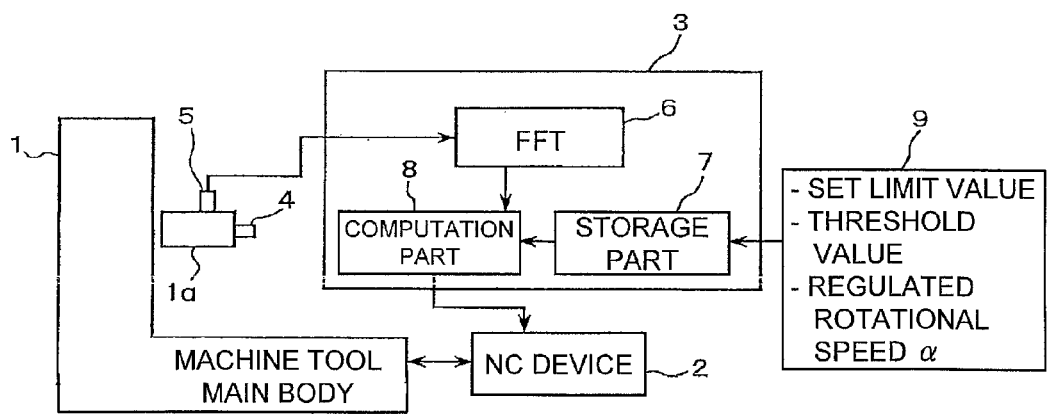
FIG. 4 is a system block diagram of an entire machine tool according to an exemplary embodiment of the present invention.

In view of the above, in the present invention, a machining starting condition is set with reference to the stability limit curve, and during machining, occurrence of chatter vibrations is detected. When chatter vibrations have actually occurred, the spindle rotational speed is regulated with reference to the stability limit curve. Thus, chatter vibrations are configured to be inhibited. Entire Structure FIG. 4 is a block diagram of an entire system of a machine tool according to an exemplary embodiment of the present invention. As represented in the drawing, the present system includes: a machine tool main body 1; a numeric control device (NC device) 2 configured to control machining of the machine tool main body 1; and a control device 3 configured to give a command of the cutting-in amount and that of the spindle rotational speed to the numeric control device 2. The machine tool main body 1 is provided with a spindle 1*a* configured to be rotated by a motor, and a cutting tool 4 is attached to the tip of the spindle 1*a*. Further, the spindle 1*a* is provided with a vibration detection sensor 5 for measuring vibrations of the spindle 1*a*. For example, an accelerometer is used as the vibration detection sensor 5. Further, the numeric control device 2 is provided with: a storage device in which a machining program is stored; and an operating panel for setting a machining condition.

The control device 3 includes: a fast Fourier transform part (FFT) 6 configured to execute fast Fourier transform with respect to a signal from the vibration detection sensor 5; a storage part 7 in which a set of stability limit curve data is stored; and a computation part 8 configured to execute a variety of computations. The computation part 8 has: a function of determining whether or not chatter vibrations have occurred based on an input from the fast Fourier transform part 6; and a function of giving a command of regulating the spindle rotational speed to the numeric control device 2 when chatter vibrations have occurred. Further, the computation part 8 has a function of determining whether or not the spindle rotational speed does not exceed a preliminarily set maximum/minimum value (setting limit value) when the spindle rotational speed is regulated. On the other hand, through an input device 9 such as a keyboard, the storage part 7 is configured to receive inputs such as: a setting limit value; a threshold value for determining existence/non-existence of chatter vibrations; and a regulative rotational speed (α) in use for regulating the spindle rotational speed. Yet on the other hand, the input device 9 is used for allowing an operator to set the spindle rotational speed and the tool cutting-in amount in starting machining with reference to the set of stability limit curve data. It should be noted that the spindle rotational speed and the tool cutting-in amount in starting machining may be configured to be inputted through the operating panel of the numeric control device 2. Alternatively, the spindle rotational speed and the tool cutting-in amount in starting machining may be determined with reference to the stability limit curve by means of the computation part 8, and may be set for the numeric control device 2.

Machining Control Method

In the machine tool of the present exemplary embodiment, a method of controlling the spindle rotational speed includes the following steps.

The first step: a set of stability limit curve data, indicating for a given spindle rotational speed the limit cutting-in amount whereby chatter vibrations are inhibited, is calculated based on characteristic values of the cutting tool (mass, damping constant, spring constant), a coefficient determined depending on a workpiece material (specific cutting force) and a machining condition (external force). The set of stability limit curve data is preliminarily calculated prior to the start of machining, and is stored in the storage part 7 of the control device 3.

The second step: the spindle rotational speed and the tool cutting-in amount are set as a machining condition in starting machining based on the set of stability limit curve data. These items as a condition are inputted by an operator through either the control device 3 or the numeric control device 2. Alternatively, the conditions may be configured to be automatically set using the set of stability limit curve data.

The third step: machining is started under the machining starting conditions set in the second step.

The fourth step: the vibration detection sensor 5 detects vibrations of the spindle in a cutting process.

The fifth step: it is determined whether or not chatter vibrations have occurred based on the vibration detection result in the fourth step.

The sixth step: when chatter vibrations have occurred, the spindle rotational speed is controlled with reference to the set of stability limit curve data, so that chatter vibrations can be inhibited.

Control Processing

Figure 5:
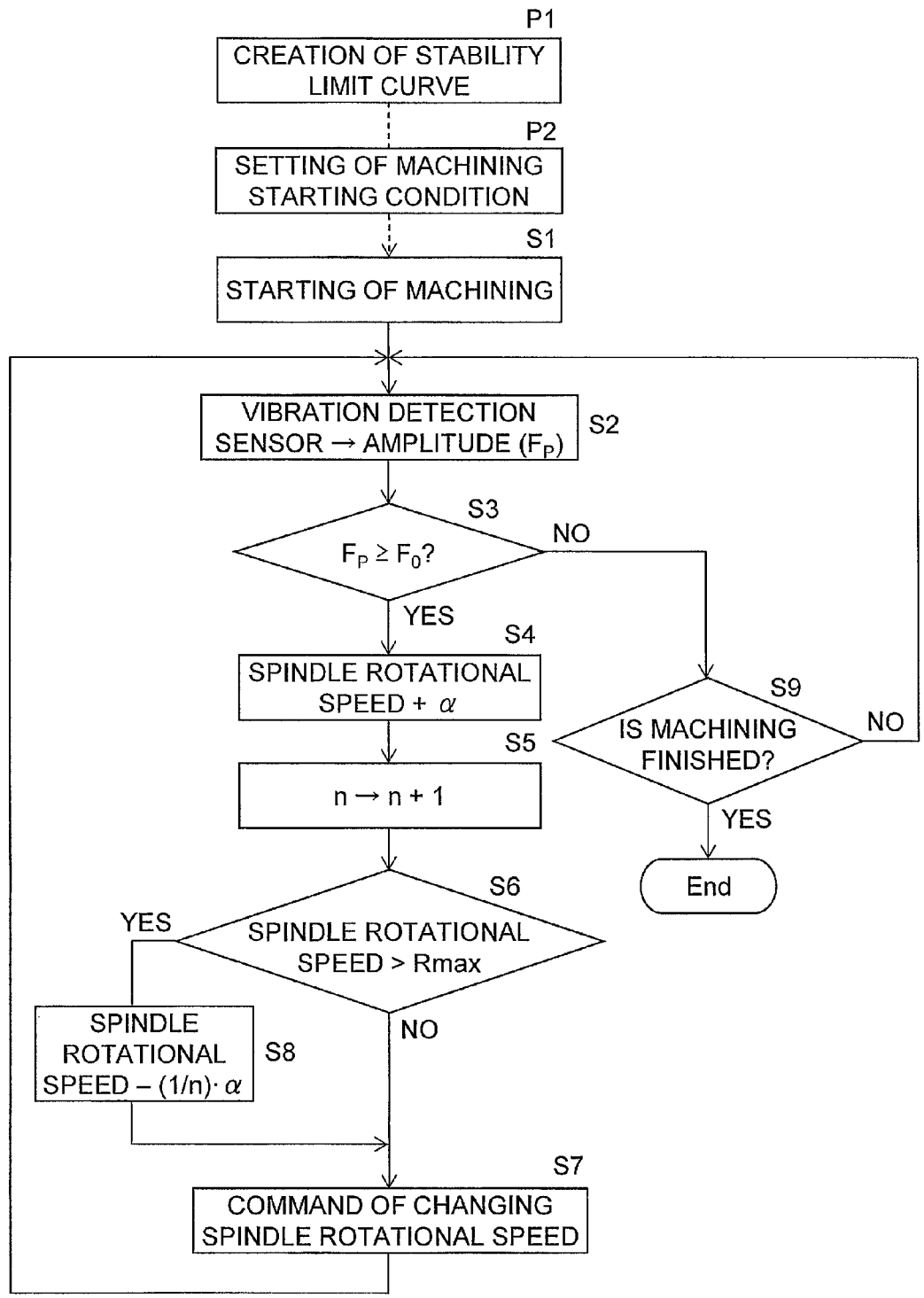
FIG. 5 is a flowchart of a processing 1 in a control processing.

A flowchart for implementing the aforementioned machining control method will be explained using FIG. 5. The flowchart includes: a preparation processing for executing cutting, which is executed separately from the processing by the control device 3; and a control processing for the spindle rotational speed during a cutting process to be executed by the control device 3.

First, a preparation step P1 is executed in executing a control processing for regulating the spindle rotational speed. In the preparation step P1, a stability limit curve is obtained by solving the aforementioned equations based on the specification of a tool to be used, a material of a workpiece as a cut blank, and a machining condition. Where the stability limit curve is obtained, the processing then proceeds to a preparation step P2 and a spindle rotational speed Rs (rpm) and a cutting-in amount a (mm) are set as machining starting conditions with reference to the stability limit curve. These conditions are inputted by an operator. Where these preparation steps P1 and P2 are finished, a control processing of Step S1 and thereafter will be executed.

Processing 1

Figure 6:
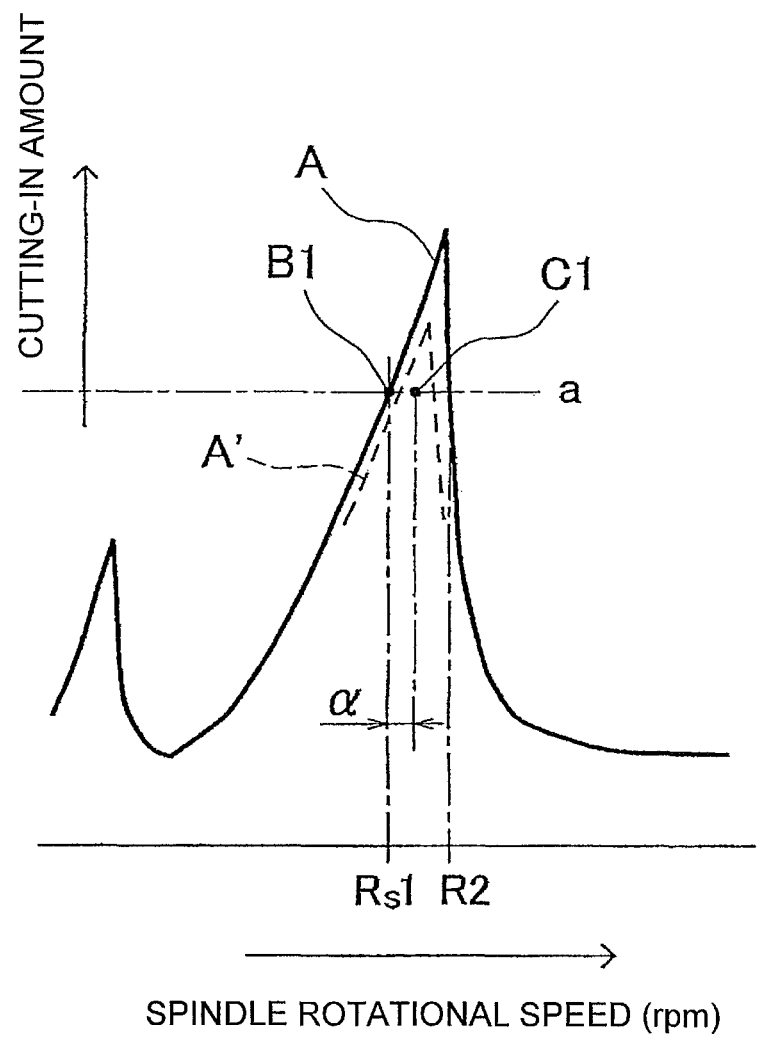
FIG. 6 is a chart for explaining existence/non-existence of chatter vibrations attributed to displacement of the stability limit curve.

As represented in FIG. 6, a processing will be hereinafter explained, where the cutting-in amount a and a spindle rotational speed Rs1 are set as a machining starting condition (condition B1).

It should be noted that as an example, the cutting-in amount a is set to be $1/\sqrt{2}$ of the maximum cutting-in amount in the stability limit curve. On the other hand, as represented in FIG. 6, the spindle rotational speed Rs1 is set to be the minimum rotational speed within a range of the stable region where the cutting-in amount is a.

First, in Step S1, a command of starting machining is transmitted to the numeric control device 2. In Step S2, a detection signal is obtained from the vibration detection sensor 5. In Step S3, it is determined whether or not chatter vibrations have occurred. Specifically, the fast Fourier transform part 6 executes fast Fourier transform with respect to the detection signal from the vibration detection sensor 5 in order to calculate an amplitude Fp of a dominant frequency, which is a frequency with the highest power. Further, it is determined whether or not the amplitude Fp is greater than or equal to a predetermined threshold value F0.

Event 1

For example, when the blank dimension of a workpiece has an error from its reference dimension and a machining stock is increased, the stability limit curve is relatively shifted downwards and represents a characteristic as depicted with a broken line A' in FIG. 6. In this case, the machining starting condition B1, set where the spindle rotational speed is Rs1 and the cutting-in amount is a, is out of the stable region. Therefore, chatter vibrations are supposed to occur.

When chatter vibrations have occurred, the amplitude Fp becomes greater than or equal to the threshold value F0. In this case, the processing proceeds from Step S3 to Step S4. In Step S4, a command value of the spindle rotational speed, transmitted to the numeric control device 2, ("the command value of the spindle rotational speed" will be hereinafter simply referred to as "the spindle rotational speed") is increased by a rotational speed $\alpha$ (rpm). Accordingly, the machining condition is shifted to a condition C1 represented in FIG. 6. Further, in Step S5, a processing of counting the frequency of increasing the spindle rotational speed will be executed. It should be noted that "n" is set to be "1" as the initial value thereof and is incremented by "+1" every time the rotational speed is increased.

Next, in Step S6, it is determined whether or not the regulated spindle rotational speed (Rs1+$\alpha$) does not exceed a set limit value (herein a set maximum rotational speed Rmax). The set maximum rotational speed Rmax is herein preliminarily set with reference to the set of stability limit curve data obtained in the preparation step P1. Specifically, in FIG. 6, the maximum spindle rotational speed within a range of the stable region is R2 where the cutting-in amount is a, and the set maximum rotational speed Rmax is set by multiplying the rotational speed R2 by 1.2 times. Actual stability limit curves are often displaced from the calculated stability limit curve A, and therefore, the rotational speed R2 is multiplied by 1.2 times for shifting the maximum rotational speed to the higher rotational speed side in consideration of the displacement.

As represented in FIG. 6, where the regulated spindle rotational speed (Rs1+$\alpha$) does not exceed the set maximum rotational speed Rmax, the processing proceeds from Step S6 to Step S7. In Step S7, a command of changing the spindle rotational speed is transmitted to the numeric control device 2, and the processing returns to Step S2.

By contrast, when the regulated spindle rotational speed (Rs1+$\alpha$) exceeds the set maximum rotational speed Rmax, the processing proceeds from Step S6 to Step S8. In Step S8, the aforementioned regulated spindle rotational speed (Rs1+ α) is reduced by a rotational speed α/n. In other words, when the frequency of regulating the spindle rotational speed is once, the regulated spindle rotational speed is reduced by a rotational speed α/2 (rpm). The processing then proceeds to Step S7, and a command of changing the spindle rotational speed is transmitted to the numeric control device 2. The processing then returns to Step S2.

With the aforementioned processing, the spindle rotational speed is changed. Further, the processing steps from Step S2 to Step S8 are repeatedly executed. When machining is finished without occurrence of chatter vibrations, the control processing is finished via Step S9.

It should be noted that, when chatter vibrations occur even by reducing the spindle rotational speed in the first-time processing in Step S8, the spindle rotational speed is further reduced by α/(2+1) and a similar processing will be executed.

Event 2

Figure 7:
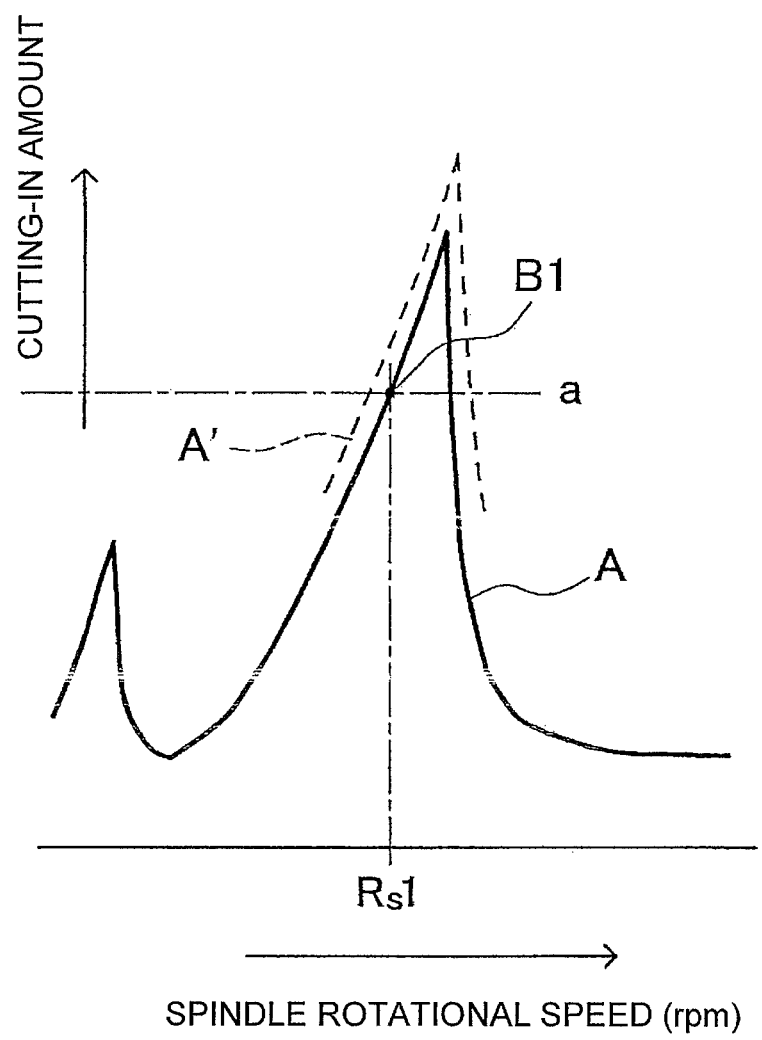
FIG. 7 is a chart for explaining regulation of a spindle rotational speed.

As represented in FIG. 7, depending on a state of a tool and/or a state of a workpiece, the actual stability limit curve A' may be displaced from the calculated stability limit curve A. In this case, the condition B1, set as the machining starting condition where the spindle rotational speed is Rs1 and the cutting-in amount is a, is plotted within the stable region. Therefore, chatter vibrations do not occur. In this case, "NO" is determined in Step S3 until machining is finished, and Steps S2 and S3 are repeatedly executed. When machining is then finished, the control processing ends.

In the event represented in FIG. 7, chatter vibrations have not herein occurred. Therefore, chances are that the condition B1 is shifted outside the stable region when the spindle rotational speed is increased. Further, even when the spindle rotational speed is increased by the extent that chatter vibrations do not occur, remarkable reduction in machining time cannot be expected. Therefore, in this case, the spindle rotational speed is configured to be maintained at the rotational speed Rs1 in the start of machining.

Processing 2

Figure 8:
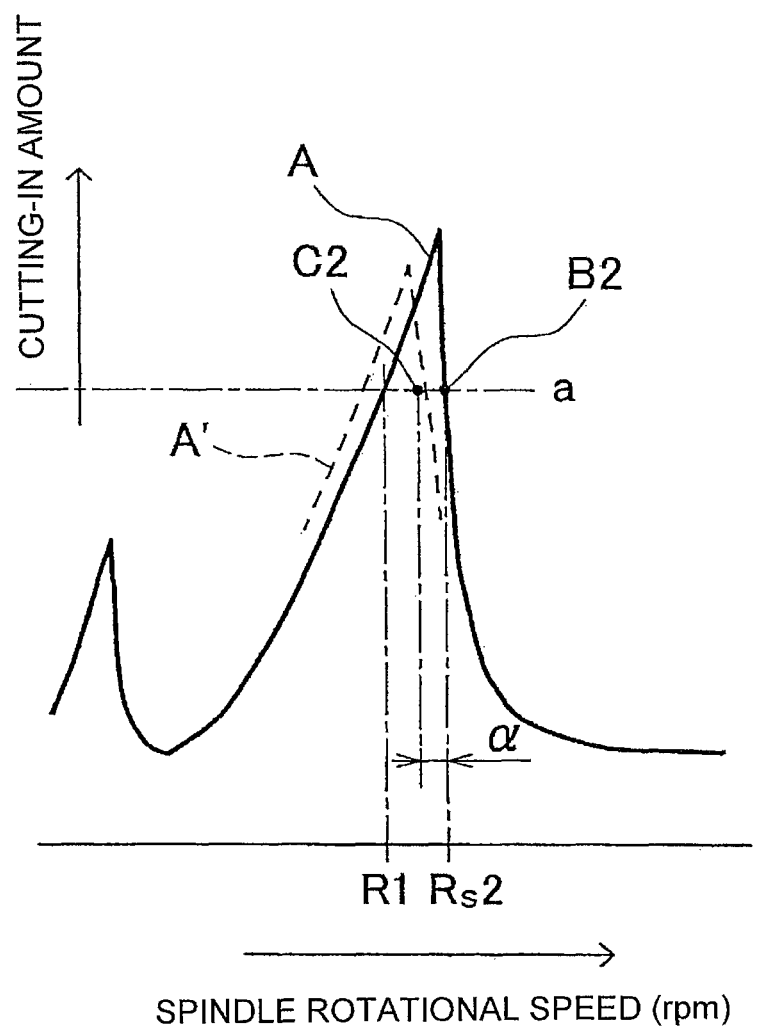
FIG. 8 is a chart for explaining existence/non-existence of chatter vibrations attributed to the stability limit curve.

Next, using a flowchart of FIG. 9, explanation will be made for a processing where the cutting-in amount a and a spindle rotational speed RS2 are set as a machining starting condition (condition B2) as represented in FIG. 8. It should be noted that in FIG. 9, processing steps including Steps S11 to S13, S15, S17 and S19 are similar to those in the processing 1. Further, the cutting-in amount a is similar to that in the processing 1. As represented in FIG. 8, the spindle rotational speed Rs2 is the maximum rotational speed within a range of the stable region where the cutting-in amount is a.

In the processing 2, processing steps from Step S11 to Step S13 are completely the same as those in the processing 1, and therefore, explanation thereof will be hereinafter omitted.

Event 1

As represented in FIG. 8, depending on a state of a tool and/or a state of a workpiece, the actual stability limit curve A' may be displaced from the calculated stability limit curve A to the lower rotational speed side. In this case, the processing condition B2, set where the spindle rotational speed is Rs2 and the cutting-in amount is a, is plotted outside the stable region. Therefore, chatter vibrations are supposed to occur.

Figure 9:
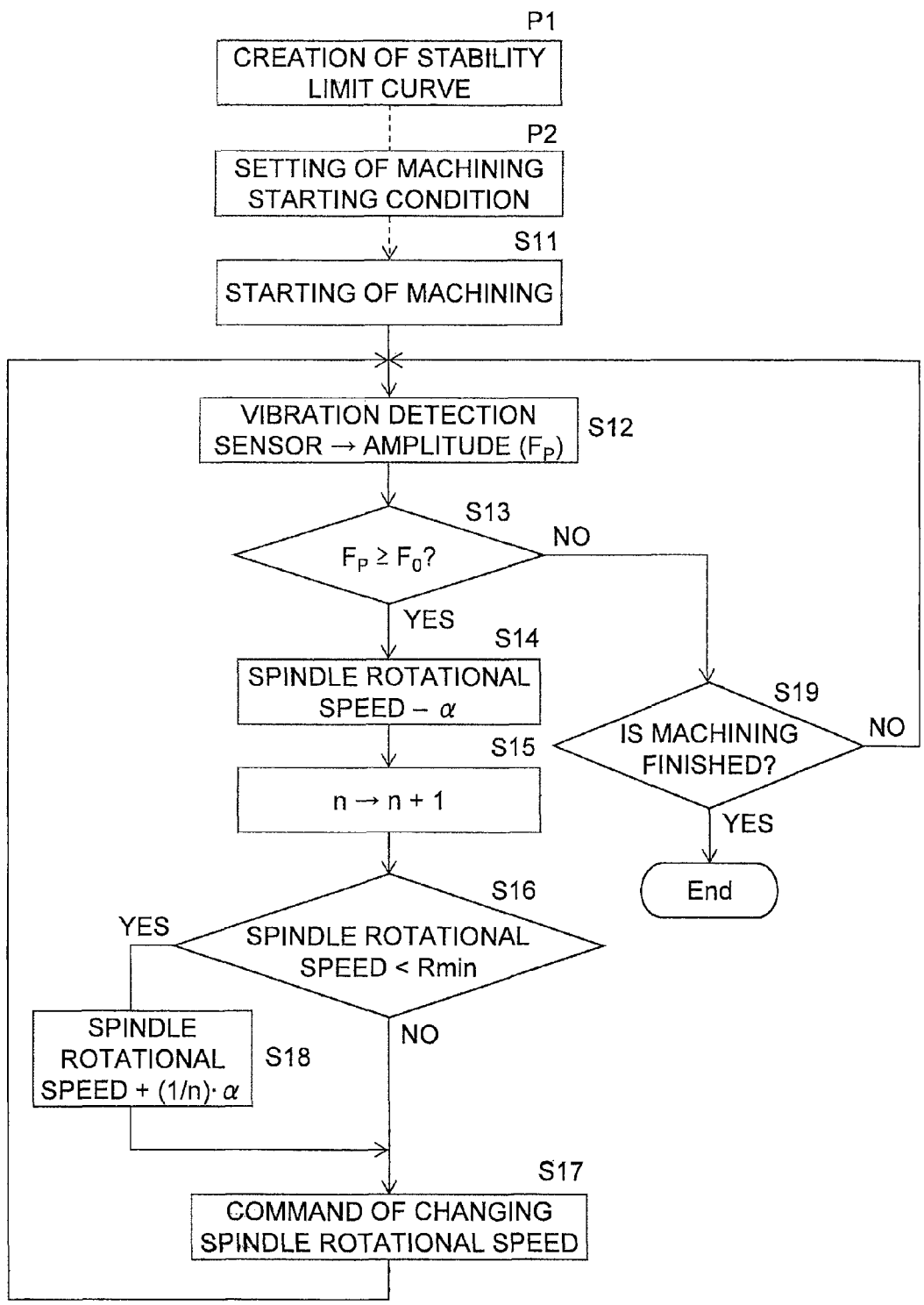
FIG. 9 is a flowchart of a processing 2 in the control processing.

When chatter vibrations have occurred, the processing proceeds from Step S13 to Step S14 in FIG. 9. In Step S14, the spindle rotational speed Rs2 is reduced by α (rpm). Accordingly, the machining condition is shifted to a condition C2 represented in FIG. 8. Further, in Step S15, a processing of counting the frequency of reducing the rotational speed is executed.

Next in Step S16, it is determined whether or not the regulated spindle rotational speed (Rs2−α) is lower than a set limit value (herein a set minimum rotational speed Rmin). The set minimum rotational speed Rmin is herein a rotational speed set by multiplying the minimum rotational speed R1 within the stable region where the cutting-in amount is a by 0.8 times in FIG. 8. Similarly to the above, actual stability limit curves are often displaced from the calculated stability limit curve A. Therefore, the rotational speed R1 is multiplied by 0.8 times for shifting the set minimum rotational speed (Rmin) to the lower rotational speed side in consideration of the displacement.

As represented in FIG. 8, when the regulated spindle rotational speed (Rs2−α) is greater than or equal to the set minimum rotational speed Rmin, the processing proceeds from Step S16 to Step S17. In Step S17, a command of changing the spindle rotational speed is transmitted to the numeric control device 2. The processing then returns to Step S12.

By contrast, when the regulated spindle rotational speed (Rs2−α) is lower than the set minimum rotational speed Rmin, the processing proceeds from Step S16 to Step S18. In Step S18, the regulated spindle rotational speed (Rs2−α) is increased by a rotational speed α/n. The processing then proceeds to Step S17, and a command of changing the spindle rotational speed is transmitted to the numeric control device 2. The processing then returns to Step S12.

Event 2

Figure 10:
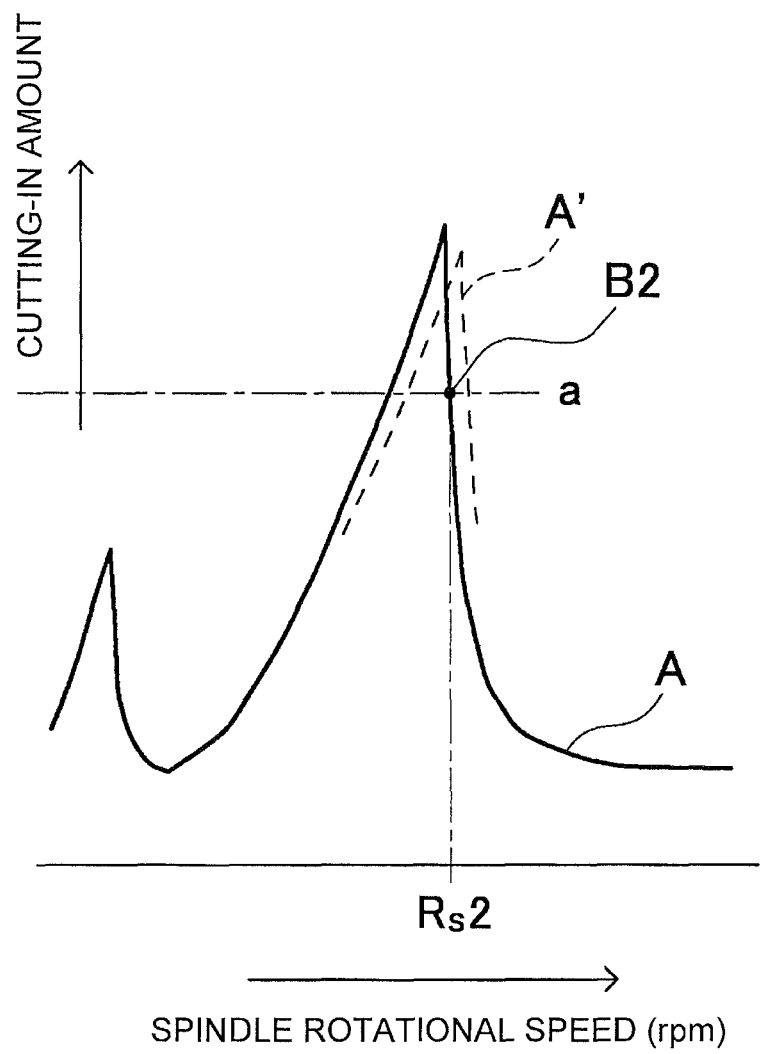
FIG. 10 is a chart for explaining regulation of the spindle rotational speed.

As represented in FIG. 10, depending on a state of a tool and/or a state of a workpiece, the actual stability limit curve A' may be displaced from the calculated stability limit curve A to the higher rotational speed side. In this case, the condition B2, set as the machining starting condition where the spindle rotational speed is Rs2 and the cutting-in amount is a, is plotted within the stable region. Therefore, chatter vibrations do not occur. In this case, NO is determined in Step S13 until machining is finished, and Steps S12 and S13 are repeatedly executed. When machining is then finished, the control processing ends.

In the event 2, chatter vibrations have not occurred. Therefore, chances are that the condition B2 is shifted outside the stable region when the spindle rotational speed is increased. Further, even when the spindle rotational speed is increased by the extent that chatter vibrations do not occur, remarkable reduction in machining time cannot be expected. Therefore, in this case, the spindle rotational speed is configured to be maintained at the rotational speed in the start of machining.

Features

When chatter vibrations have occurred during a cutting process, chatter vibrations can be inhibited by controlling the spindle rotational speed. Additionally, chatter vibrations can be inhibited without remarkably changing the spindle rotational speed. Therefore, remarkable deterioration in machining efficiency can be avoided. Further, the processing of controlling the spindle rotational speed does not require the change of the machining program, and therefore, can be executed during machining and can quickly deal with machining situations on a case-by-case basis.

(2) With reference to the stability limit curve, it is determined whether or not the regulated spindle rotational speed is not higher than the set maximum rotational speed or whether or not the regulated spindle rotational speed is not lower than the set minimum rotational speed, and in accordance therewith, an appropriate rotational speed control is executed. Therefore, chatter vibrations can be quickly and stably inhibited.

(3) When the machining starting condition is set to be the minimum rotational speed for a given cutting-in amount within the stable region, the control can be easily executed compared to the case that the machining starting condition is set to be the maximum rotational speed for a given cutting-in amount within the stable region. When explained in more detail, within the stable region of the stability limit curve, a lower rotational speed side characteristic has a slope gentler than that of a higher rotational speed side characteristic. Therefore, chatter vibrations can be easily inhibited without minutely setting the increase/reduction amount of the spindle rotational speed to be regulated.

(4) Contrary to the above, when the machining starting condition is set to be the maximum rotational speed for a given cutting-in amount within the stable region, the machining time can be reduced.

Other Exemplary Embodiments

The present invention is not limited to the embodiment as described above, and a variety of changes or modifications can be made without departing from the scope of the present invention.

(a) The aforementioned exemplary embodiment has exemplified the case that it is given where the machining starting condition exists with respect to the stability limit curve. In this case, it is not required to determine whether the rotational speed should be increased or reduced in the control processing of regulating the spindle rotational speed. Specifically, in Step S4 of the processing 1 and Step S14 of the processing 2, the machining condition can be shifted into the stable region in the processing of either increasing or reducing the spindle rotational speed by a predetermined rotational speed α.

However, when the machining starting condition is automatically set, it may not be clear in which position the spindle rotational speed in starting machining is plotted within the stable region.

In more detail, when the machining starting condition is automatically set, the machining starting condition should be set within the stable region in terms of computation. However, similarly to the aforementioned exemplary embodiment, chances are that the set machining starting condition is displaced out of the stable region due to an error in blank dimension of a workpiece from its reference dimension and/or the like in an actual situation.

In such case, chatter vibrations occur during machining. Therefore, the machining condition is required to be shifted into the stable region by regulating the spindle rotational speed. However, when the machining starting condition is automatically set, it may not be clear in which position the machining starting condition is set within the stable region, i.e., whether the machining starting condition is set either on the lower rotational speed side or on the higher rotational speed side. In such case, in regulating the spindle rotational speed, it cannot be judged whether the spindle rotational speed should be increased or reduced.

In view of the above, it is determined based on the following logic whether the spindle rotational speed is increased or reduced.

Figure 11:
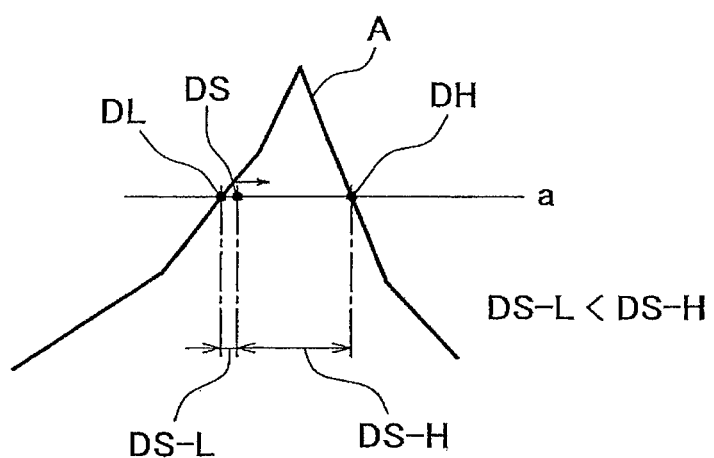
FIG. 11 is a diagram for explaining the logic to determine increase/reduction in the spindle rotational speed according to another exemplary embodiment of the present invention.
Figure 11:
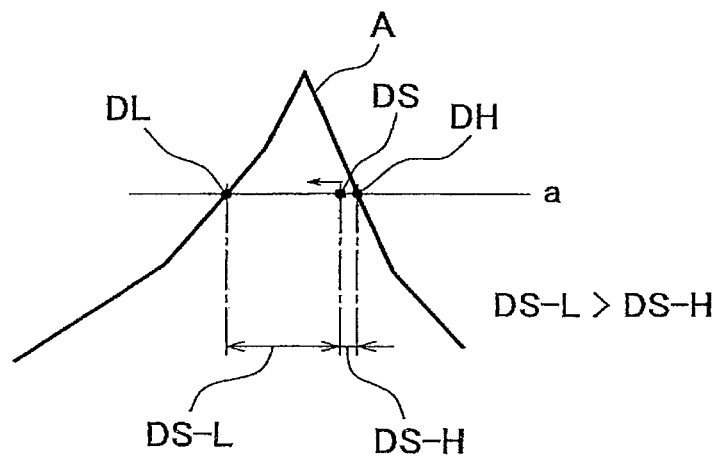

First, a part of the stability limit curve A is modeled and represented in FIG. 11. The storage part 7 stores sets of data regarding the stability limit curve A as a two dimensional table of the cutting-in amount with respect to the spindle rotational speed. With reference to the sets of data contained within the table and the data of the machining starting condition, it is determined whether the spindle rotational speed should be increased or reduced. Specifically, as represented in FIG. 11(a), it is assumed that a set of data DS is set as the machining starting condition with reference to the table of the stability limit curve A. Next, the sets of data contained within the table of the stability limit curve A are scanned, and a set of data DL and a set of data DH are obtained. In the set of data DL, the spindle rotational speed is minimum within the stable region where the cutting-in amount is a, which is the same as the cutting-in amount in the set of data DS. In the set of data DH, the spindle rotational speed is maximum within the stable region where the cutting-in amount is a. Further, a rotational speed difference DS-L between the set of data DS and the set of data DL and a rotational speed difference DS-H between the set of data DS and the set of data DH will be calculated. Then, when the rotational speed difference DS-H is greater than the rotational speed difference DS-L, the spindle rotational speed is increased as represented in FIG. 11(a). By contrast, when the rotational speed difference DS-L is greater than the rotational speed difference DS-H, the spindle rotational speed is reduced as represented in FIG. 11(b).

Figure 12:
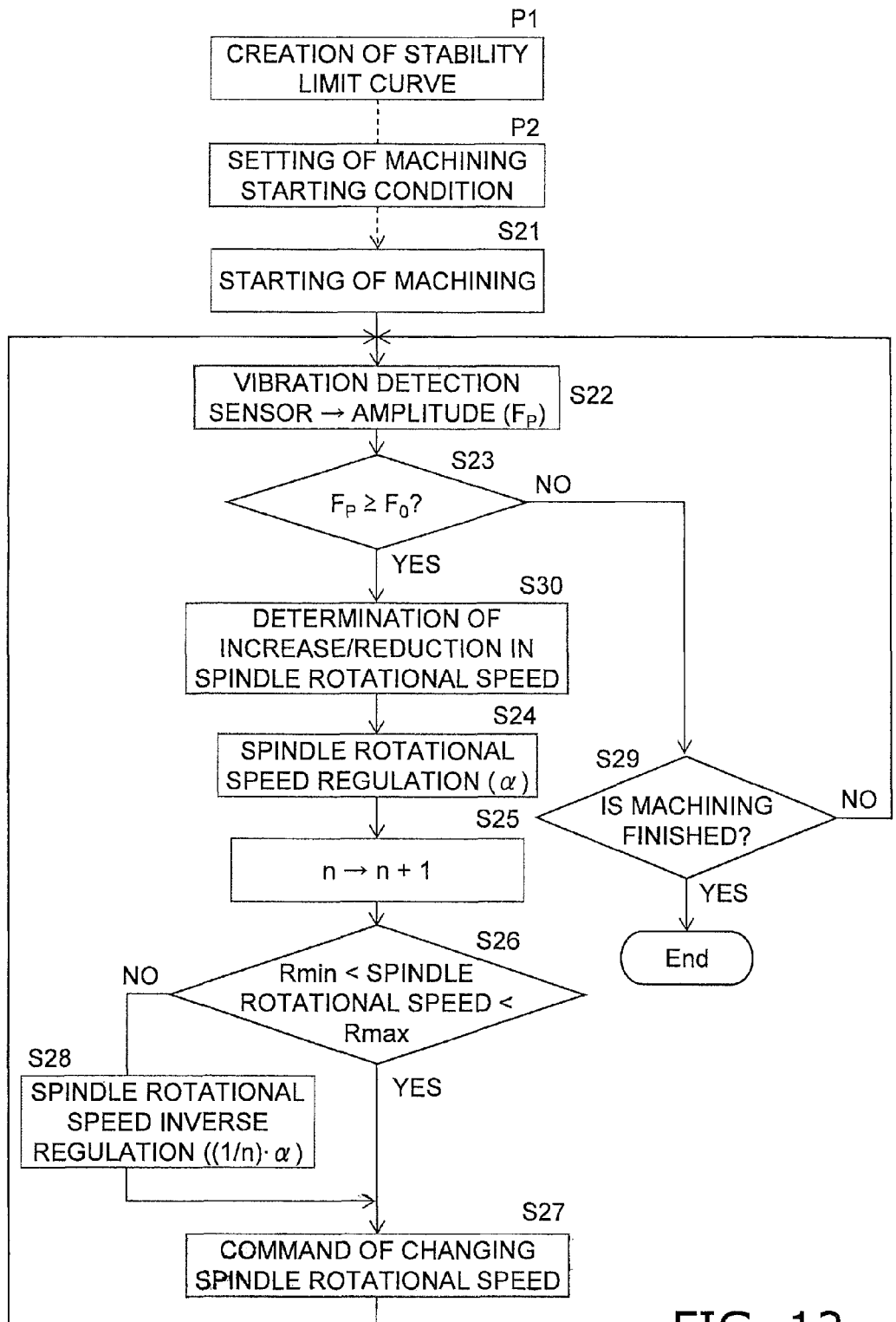
FIG. 12 is a flowchart of a control processing according to another exemplary embodiment of the present invention.

FIG. 12 represents a flowchart of a control processing of the spindle rotational speed including the aforementioned decision. In the flowchart, the processing steps S21 to S23, S27 and S29 are similar to those in the aforementioned exemplary embodiment.

As described above, chances are that, although the machining starting condition is set within the stable region, the stability limit curve is displaced from the calculated one due to an error in blank dimension of a workpiece from its reference dimension and/or the like and the automatically set machining starting condition is displaced out of the stable region. In this case, chatter vibrations occur during machining.

In view of this, when it is determined that chatter vibrations have occurred in Step S23, the processing proceeds from Step S23 to Step S30. In Step S30, it is determined whether the spindle rotational speed should be increased or reduced based on the aforementioned logic explained using FIG. 11. Next, in Step S24, the spindle rotational speed to be transmitted to the numeric control device 2 is either increased or reduced by a predetermined rotational speed (α) based on the decision of Step S30. Further, in Step S25, a processing of counting the frequency of regulating the spindle rotational speed will be executed. It should be noted that similarly to the above, "n" is set to be "1" as the initial value thereof and is incremented by "+1" every time the rotational speed is regulated.

Next, in Step S26, with reference to the set of data regarding the stability limit curve A, it is determined whether or not the regulated spindle rotational speed is within a range of the set limit value. In other words, it is determined whether or not the regulated spindle rotational speed is greater than the set minimum rotational speed Rmin and is less than the set maximum rotational speed Rmax. The respective rotational speeds Rmin and Rmax are preliminarily set similarly to the aforementioned exemplary embodiment.

When the regulated spindle rotational speed is within a range of an allowable rotational speed, the processing proceeds from Step S26 to Step S27. In Step S27, a command of changing the spindle rotational speed is transmitted to the numeric control device 2. The processing then returns to Step S22.

By contrast, when the regulated spindle rotational speed is out of the range of the allowable rotational speed, the processing proceeds from Step S26 to Step S28. In Step S28, the previously regulated spindle rotational speed is regulated in the opposite direction. In other words, when the frequency of regulating the spindle rotational speed is once, the previously regulated rotational speed is regulated by a rotational speed α/2 (rpm) in a direction opposite to that in Step S24. The processing then proceeds to Step S27 and a command of changing the spindle rotational speed is transmitted to the numeric control device 2. The processing then returns to Step S22.

With the aforementioned processing, the spindle rotational speed is changed. Further, the processing steps S22 and thereafter are repeatedly executed. When machining is finished without occurrence of chatter vibrations, the control processing is finished via Step S29.

It should be noted that, when chatter vibrations occur even by regulating the spindle rotational speed in the opposite direction in the first-time processing in Step S28, the spindle rotational speed is further regulated by α/(2+1) and a similar processing will be executed.

Even in the present exemplary embodiment as herein described, it is possible to obtain an advantageous effect similar to that achieved in the aforementioned exemplary embodiment. Especially, the machining starting condition can be automatically set, and therefore, machining can be more efficiently executed.

(b) In the aforementioned exemplary embodiment, the cutting-in amount in starting machining is set to be $1/\sqrt{2}$ of the maximum cutting-in amount in the stability limit curve. However the value is exemplary only and the present invention is not limited to the value.

(c) In the aforementioned exemplary embodiment, the control device 3 is provided separately from the numeric control device 2 of the machine tool. However, the control device 3 may be embedded in the numeric control device 2.

INDUSTRIAL APPLICABILITY

A machine tool and a machining control device of the same in the present invention can easily and stably inhibit chatter vibrations having occurred during a cutting process when executing cutting under a condition set based on a stability limit curve.

The invention claimed is:

1. A machining control device for a machine tool comprising
   a controller programmed to control a rotational speed of a spindle of the machine tool, the spindle being a part onto which a cutting tool for cutting a workpiece is attached; and
   a vibration detection sensor configured to detect vibrations of the spindle during cutting and generate a vibration detection signal, the vibration detection sensor being operatively arranged to communicate the detection signal to the controller,
   the controller including a data storage configured to store a set of stability limit curve data indicating a relation between a spindle rotational speed and a limit cutting-in amount whereby chatter vibrations are inhibited,
   the controller being configured to
      set both a spindle rotational speed in starting machining and a cutting-in amount of the cutting tool in starting machining based on the set of stability limit curve data, the stability limit curve data defining a spindle rotational speed versus cutting-in amount of the cutting tool characteristic:
      determine whether or not chatter vibrations have occurred based on a result of detection by the vibration detection sensor;
      set the cutting-in amount of the cutting tool in starting machining to be a machining starting cutting-in amount less than a maximum cutting-in amount within a stable region in the set of stability limit curve data, the stable region being a region in which the chatter vibrations are inhibited; and
      set the spindle rotational speed in starting machining to a machining starting rotational speed that corresponds to the machining starting cutting-in amount according to the stability limit curve data, the machining starting rotational speed being less than a rotational speed corresponding to the maximum cutting-in amount within the stable region;
   the controller being further configured to control the spindle rotational speed to be the machining starting rotational speed during operation of the machine tool, and to maintain the spindle rotational speed at the machining starting rotational speed when chatter vibrations have not occurred during operation of the machine tool,
   the controller being further configured to determine a first new spindle rotational speed during operation of the machine tool by increasing the spindle rotational speed during operation of the machine tool by an amount of a predetermined rotational speed when chatter vibrations have occurred during operation of the machine tool,
   the controller being further configured to
      determine whether the first new spindle rotational speed is within an allowable range, the allowable range being determined with reference to the set of stability limit curve data;
      operate the spindle at the first new spindle rotational speed when the first new spindle rotational speed is within the allowable range, and
      operate the spindle at a second new spindle rotational speed when the first new spindle rotational speed is not within the allowable range, the second new spindle rotational speed being set based on the first new spindle rotational speed, the amount of the predetermined rotational speed, and a number of times the spindle rotational speed during operation of the machine tool has been increased by the amount of the predetermined rotational speed.

2. The machining control device for a machine tool recited in claim 1, wherein the set of stability limit curve data is calculated based on a characteristic value of the cutting tool obtained by a vibration analysis,
a coefficient determined based on a material of the workpiece, and
a machining condition.

3. A machining control device for a machine tool comprising:
a controller programmed to control a rotational speed of a spindle of the machine tool, the spindle being a part onto which a cutting tool for cutting a workpiece is attached; and
a vibration detection sensor configured to detect vibrations of the spindle during cutting and generate a vibration detection signal, the vibration detection sensor being operatively arranged to communicate the detection signal to the controller,
the controller including a data storage configured to store a set of stability limit curve data indicating a relation between a spindle rotational speed and a limit cutting-in amount whereby chatter vibrations are prohibited,
the controller being configured to
set both a spindle rotation speed in starting machining and a cutting-in amount of the cutting tool in starting machining based on the set of stability limit curve data, the stability limit curve data defining a spindle rotational speed versus cutting-in amount of the cutting tool characteristic;
determine whether or not chatter vibrations have occurred based on a result of detection by the vibration detection sensor;
set the cutting-in amount of the cutting tool in starting machining to be a machining starting cutting-in amount less than a maximum cutting-in amount within a stable region in the set of stability limit curve data, the stable region being a region in which the chatter vibrations are inhibited; and
set the spindle rotational speed in starting machining to a machining starting rotational speed that corresponds to the machining starting cutting-in amount according to the stability limit curve data, the machining starting rotational speed being greater than a rotational speed corresponding to the maximum cutting-in amount within the stable region;
the controller being further configured to control the spindle rotational speed to be the machining starting rotational speed during operation of the machine tool, and to maintain the spindle rotational speed at the machining starting rotational speed when chatter vibrations have not occurred during operation of the machine tool,
the controller being further configured to determine a first new spindle rotational speed during operation of the machine tool by decreasing the spindle rotational speed during operation of the machine tool by an amount of a predetermined rotational speed when chatter vibrations have occurred during operation of the machine tool,
the controller being further configured to
determine whether the first new spindle rotational speed is within an allowable range, the allowable range being determined with reference to the set of stability limit curve data;
operate the spindle at the first new spindle rotational speed when the first new spindle rotational speed is within the allowable range, and
operate the spindle at a second new spindle rotational speed when the first new spindle rotational speed is not within the allowable range, the second new spindle rotational speed being set based on the first new spindle rotational speed, the amount of the predetermined rotational speed, and a number of times the spindle rotational speed during operation of the machine tool has been decreased by the amount of the predetermined rotational speed.

4. The machining control device for a machine tool recited in claim 3, wherein the set of stability limit curve data is calculated based on
a characteristic value of the cutting tool obtained by a vibration analysis,
a coefficient determined based on a material of the workpiece, and
a machining condition.

5. A machine tool comprising:
machining control device configured to generate and transmit a control command;
a spindle with a cutting tool attached onto a tip thereof; and
a numeric control part configured to set and control a machining condition including a cutting-in amount of the cutting tool and a rotational speed of the spindle based on the control command transmitted from the machining control device,
the machining control device including
a controller programmed to generate the control command, the controller including a data storage to store a set of stability limit curve data indicating a relation between a spindle rotational speed and a limit cutting-in amount whereby chatter vibrations are inhibited, and a vibration detection sensor configured to detect vibrations of the spindle
during cutting and generate a vibration detection signal, the vibration detection sensor being operatively arranged to communicate the detection signal to the controller,
the controller being configured to
set both a spindle rotational speed and a cutting-in amount of the cutting tool in starting machining based on the set of stability limit curve data, the stability limit curve data defining a spindle rotational speed versus cutting-in amount of the cutting tool characteristic,
determine whether or not chatter vibrations have occurred based on a result of detection by the vibration detection sensor;
set the cutting-in amount of the cutting tool in starting machining to be a machining starting cutting-in amount less than a maximum cutting-in amount within a stable region in the set of stability limit curve data, the stable region being a region in which the chatter vibrations are inhibited; and
set the spindle rotational speed in starting machining to a machining starting rotational speed that corresponds to the machining starting cutting-in amount according to the stability limit curve data, the machining starting rotational speed being less than a rotational speed corresponding to the maximum cutting-in amount within the stable region;
the controller being further configured to control the spindle rotational speed to be the machining starting rotational speed during operation of the machine tool, and to maintain the spindle rotational speed at the machining starting rotational speed when chatter vibrations have not occurred during operation of the machine tool, the controller being further configured to determine a first new spindle rotational speed during operation of the machine tool by increasing the spindle rotational speed during operation of the machine tool by an amount of a predetermined rotational speed when chatter vibrations have occurred during operation of the machine tool, the controller being further configured to
- determine whether the first new spindle rotational speed is within an allowable range, the allowable range being determined with reference to the set of stability limit curve data;
- operate the spindle at the first new spindle rotational speed when the first new spindle rotational speed is within the allowable range, and
- operate the spindle at a second new spindle rotational speed when the first new spindle rotational speed is not within the allowable range, the second new spindle rotational speed being set based on the first new spindle rotational speed, the amount of the predetermined rotational speed, and a number of times the spindle rotational speed during operation of the machine tool has been increased by the amount of the predetermined rotational speed.

6. The machine tool recited in claim 5, wherein the set of stability limit curve data is calculated based on
- a characteristic value of the cutting tool obtained by a vibration analysis,
- a coefficient determined based on a material of the workpiece, and
- a machining condition.

7. A machine tool comprising:
- machining control device configured to generate and transmit a control command;
- a spindle with a cutting tool attached onto a tip thereof; and
- a numeric control part configured to set and control a machining condition including a cutting-in amount of the cutting tool and a rotational speed of the spindle based on the control command transmitted from the machining control device, the machining control device including
- a controller programmed to generate the control command, the controller including a data storage to store a set of stability limit curve data indicating a relation between a spindle rotational speed and a limit cutting-in amount whereby chatter vibrations are inhibited, and
- a vibration detection sensor configured to detect vibrations of the spindle during cutting and generate a vibration detection signal, the vibration detection sensor being operatively arranged to communicate the detection signal to the controller, the controller being configured to
- set both a spindle rotational speed and a cutting-in amount of the cutting tool in starting machining based on the set of stability limit curve data, the stability limit curve data defining a spindle rotational speed versus cutting-in amount of the cutting tool characteristic,
- determine whether or not chatter vibrations have occurred based on a result of detection by the vibration detection sensor;
- set the cutting-in amount of the cutting tool in starting machining to be a machining starting cutting-in amount less than a maximum cutting-in amount within a stable region in the set of stability limit curve data, the stable region being a region in which the chatter vibrations are inhibited; and
- set the spindle rotational speed in starting machining to a machining starting rotational speed that corresponds to the machining starting cutting-in amount according to the stability limit curve data, the machining starting rotational speed being greater than a rotational speed corresponding to the maximum cutting-in amount within the stable region;

the controller being further configured to control the spindle rotational speed to be the machining starting rotational speed during operation of the machine tool, and to maintain the spindle rotational speed at the machining starting rotational speed when chatter vibrations have not occurred during operation of the machine tool, the controller being further configured to determine a first new spindle rotational speed during operation of the machine tool by decreasing the spindle rotational speed during operation of the machine tool by an amount of a predetermined rotational speed when chatter vibrations have occurred during operation of the machine tool, the controller being further configured to
- determine whether the first new spindle rotational speed is within an allowable range, the allowable range being determined with reference to the set of stability limit curve data;
- operate the spindle at the first new spindle rotational speed when the first new spindle rotational speed is within the allowable range, and
- operate the spindle at a second new spindle rotational speed when the first new spindle rotational speed is not within the allowable range, the second new spindle rotational speed being set based on the first new spindle rotational speed, the amount of the predetermined rotational speed, and a number of times the spindle rotational speed during operation of the machine tool has been decreased by the amount of the predetermined rotational speed.

8. The machine tool recited in claim 7, wherein the set of stability limit curve data is calculated based on
- a characteristic value of the cutting tool obtained by a vibration analysis,
- a coefficient determined based on a material of the workpiece, and
- a machining condition.

* * * * *